June 30, 1953 P. D. BECKER 2,643,918
DEVICE FOR ATTACHING HUBCAPS
Filed June 16, 1949 2 Sheets-Sheet 1
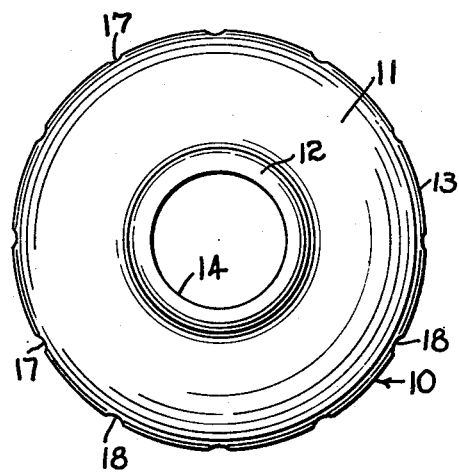
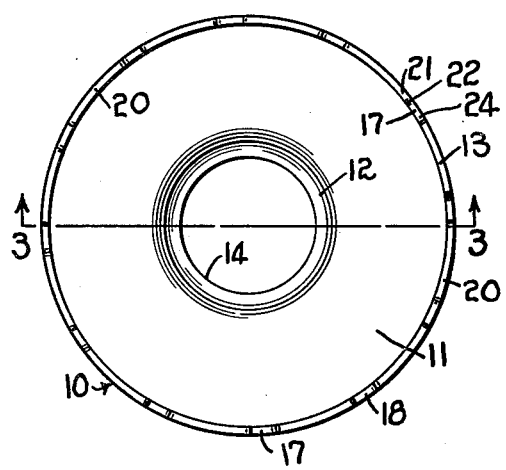
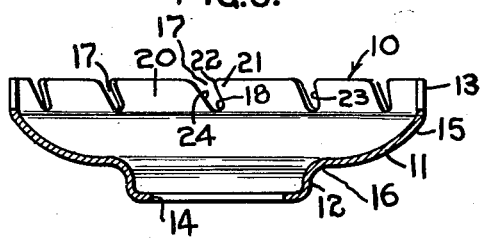
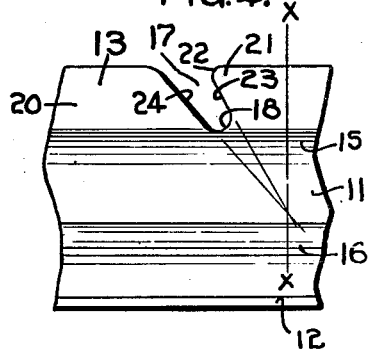
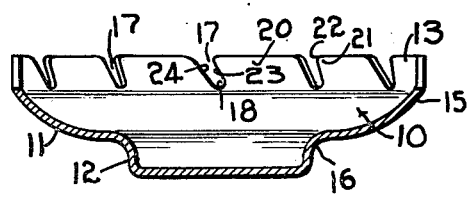
INVENTOR:
PHILIP D. BECKER,
BY Philip E. Parker
ATTORNEY.

June 30, 1953 — P. D. BECKER — 2,643,918
DEVICE FOR ATTACHING HUBCAPS
Filed June 16, 1949 — 2 Sheets-Sheet 2

INVENTOR:
PHILIP D. BECKER,
BY Philip E. Parker
ATTORNEY.

Patented June 30, 1953

2,643,918

UNITED STATES PATENT OFFICE 2,643,918

DEVICE FOR ATTACHING HUBCAPS

Philip D. Becker, Hingham, Mass., assignor to United-Carr Fastener Corporation, Cambridge, Mass., a corporation of Massachusetts Application June 16, 1949, Serial No. 99,422

6 Claims. (Cl. 301—108)

This invention relates to hub caps for wire spoke wheels and the like, such as those used for baby carriages and like vehicles, and the invention aims generally to improve existing hub caps of this type.

A primary object of the invention is the provision of an improved hub cap for wire wheels which is simple and economical in construction, easy to apply, and neat and attractive in appearance.

A further object of the invention is the provision of a hub cap for wire wheels which may be quickly and easily attached to the spokes of a wheel and securely held in position thereon by means integral with the hub cap.

A still further object of the invention is the provision of a hub cap for wire wheels having improved fastening means for securing the hub to the spokes of a wheel.

These and other objects and advantages of the invention will be apparent to persons skilled in the art from a consideration of the accompanying drawings and annexed specification illustrating and describing preferred embodiments of the invention.

In the drawings—

Fig. 1 is a top plan view of a hub cap embodying the invention;

Fig. 2 is a bottom view thereof;

Fig. 3 is a cross-sectional view of the hub cap taken on the line 3—3 of Fig. 2;

Fig. 4 is an enlarged view of a section of the hub cap showing the wire-receiving notch;

Fig. 5 is a cross-sectional view similar to Fig. 3, showing a modified form of hub cap;

Figure 6:
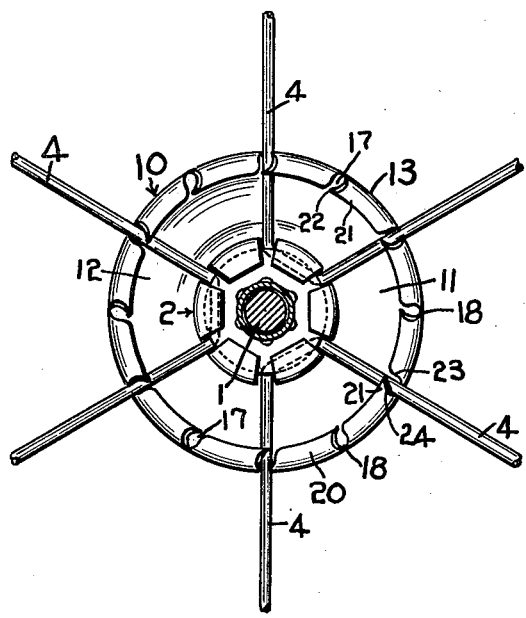
Fig. 6 is a fragmental inside side elevation of the cap applied to the outer series of wire spokes of a wheel.
Figure 8:
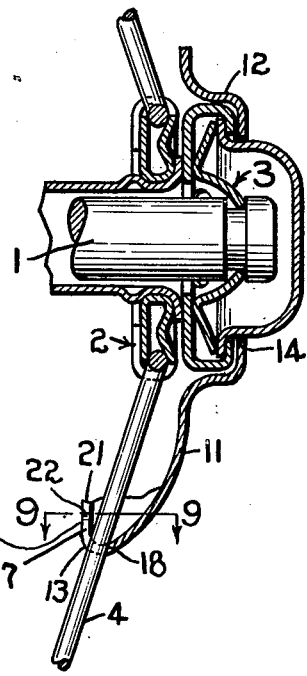
Fig. 8 is a fragmental vertical sectional view as taken on the line 8—8 of Fig. 7.
Figure 7:
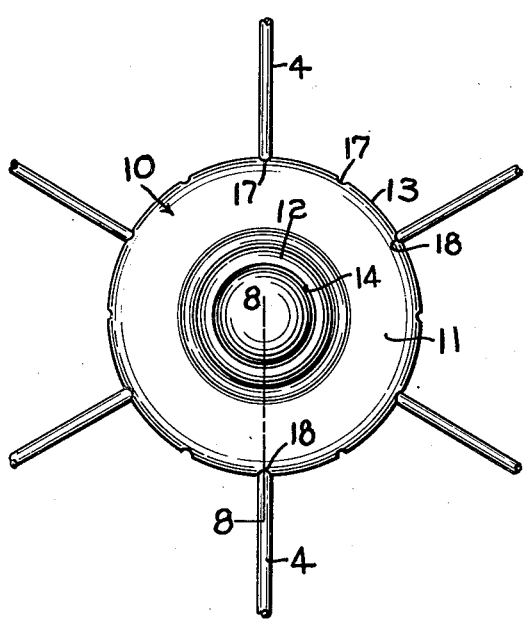
Fig. 7 is a fragmental side elevation of the wheel and cap illustrated in Fig. 6 looking from the outside thereof.
Figure 9:
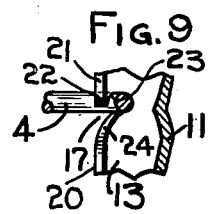
Fig. 9 is a sectional view as taken on line 9—9 of Fig. 8.

Referring now to the drawing, the improved hub cap of this invention is designated generally by the numeral 10 and consists of a cup-shaped or dish-shaped body portion 11 having an outwardly extending cap or bottom portion 12 and a concentric coaxial rim portion 13.

The cap portion 12 is designed to embrace or receive the end of an axle 1 on which a wire wheel 2 is mounted and may have an opening 14 centrally thereof, as shown in Figs. 1-3, to fit around a wheel retainer 3, such for example as that shown in my copending application Serial No. 99,423, filed June 16, 1949, now Patent No. 2,615,759, October 28, 1952. Alternatively, the cap portion 12 may be solid, as illustrated in Fig. 5, as when used with a wheel in which the retainer therefor is disposed inwardly of the wheel, as will be understood in the art.

The walls of the body portion 11 are preferably reversely curved in cross-sectional shape as shown at 15 and 16 in Figs. 3 and 5, and are flared into each other and into the cap and rim portions 12 and 13 so as to present a pleasing appearance while carrying out the desired functions.

In accordance with the invention the rim portion 13 is provided with a plurality of diagonally arranged slots or notches 17 having seats 18 for receiving the spokes 4 of a wire wheel 2 and defining therebetween a plurality of tongues 20 having laterally and outwardly projecting spoke-engaging portions 21 rounded off at their end portions as at 22. The disposition and number of notches 17 are, of course, determined by the number and spacing of the spokes 4. In the case of wire wheels having less than about 12 spokes it will generally be desirable to provide additional notches so that the periphery of the hub cap will be substantially circular when the tongues 20 are curled inwardly as hereinafter described. Thus the number of notches 17 will desirably be in excess of six and will preferably be about twelve or more for best results. Twelve notches are quite satisfactory and since caps so notched will fit on wheels having eight, twelve or twenty-four spokes they are pretty generally applicable to a large variety of wire wheels.

The notches 17 are inclined or diagonally arranged so that the side edge portions 23 thereof which bind one of the side edges of the spoke-engaging portions 21 preferably make angles of from about 30 to 40 degrees with the longitudinal axis $x$—$x$ of the hub cap. This insures that the portions 21 will be sufficiently large and strong and correctly positioned so that when the tongues 20 are curled inwardly, the portions 21 will engage the spokes and securely clamp the hub cap in position thereon. The opposite edge portions 24 of the notches 17 may be substantially parallel to the edge portions 23 but are preferably inclined thereto so as to make angles therewith not greater than about 10 degrees. This provides notches which have outwardly flared confining edges adapted to facilitate entry and seating of the spokes therein.

In assembling the device with a wire wheel the cap is correctly centered and positioned against the outer spokes thereof so that the open flared ends of the notches 17 lie opposite the spokes. The cap is then pushed inwardly and simultaneously rotated until the spokes are properly seated in the seats 18. The rim portion 13 is then curled inwardly so that the spoke-engaging portions 21 of the tongues 20 lie against the spokes 4 which are thus held securely in the seats 18. Curling of the rim portion 13 may be accomplished in any suitable manner such as by use of a slotted punch and die.

It will thus be seen that the present invention provides a simple and effective hub cap of good appearance which may be easily and quickly attached to the spokes of a wire wheel and securely held thereon by the novel attaching means herein described.

Various modifications of the invention described and illustrated will most likely occur to those skilled in the art to which the invention relates and may be made without departing from the spirit of the invention, the scope of which is indicated in the appended claims.

I claim:

1. A hub cap adapted to be attached to the spokes of a wire wheel comprising a cup-shaped body portion adapted to cover the hub portion of a wheel, a concentric coaxial rim portion extending laterally from the outer edges of said cup-shaped portion and having a plurality of diagonally arranged notches therein providing a plurality of tongues on said outer edges of said cup-shaped portion, said notches having seats therein for receiving the spokes of a wire wheel, the side edges of said notches being inclined in the same general direction in relation to the axis of the hub cap, the side edges of each notch extending at an angle to each other from the seat of the notch to provide an enlarged entrance to the notch, the corresponding side edges of said notches being inclined at substantially the same angles with relation to the axis of the hub cap, whereby the hub cap may be mounted on the hub of a wire spoked wheel with the inclined flaring notches in the rim portion facilitating the application of the hub cap and the insertion of the tongues formed by said notches between the spokes and permitting the tongues to be curled over to engage the spokes of the wheel.

2. A hub cap in accordance with claim 1 wherein the side edges of the notches are inclined with respect to the axis of the hub cap at about 30 degrees and 40 degrees respectively.

3. A hub cap in accordance with claim 1 wherein the side edges of each notch are inclined at about 10 degrees with respect to each other.

4. A hub cap in accordance with claim 1 wherein the body portion includes a cap portion extending outwardly therefrom centrally thereof to receive the end of an axle on which the wheel may be mounted.

5. A hub cap in accordance with claim 4 in which the cap portion has an opening therein for receiving a wheel retainer.

6. A hub cap in accordance with claim 1 wherein the body portion includes a solid cap portion extending outwardly therefrom centrally thereof to receive the end of an axle on which the wheel may be mounted.

PHILIP D. BECKER.

References Cited in the file of this patent

UNITED STATES PATENTS

| Number | Name | Date |
|---|---|---|
| 502,006 | Messmer | July 25, 1893 |
| 1,378,691 | Leblanc | May 17, 1921 |
| 1,620,259 | Karle | Mar. 8, 1927 |
| 1,861,278 | Kuniholm | May 31, 1932 |
| 2,125,506 | Kroll | Aug. 2, 1938 |
| 2,152,253 | Greene | Mar. 28, 1939 |
| 2,253,708 | Holman | Aug. 26, 1941 |